US009449096B2

(12) United States Patent
Balmin et al.

(10) Patent No.: US 9,449,096 B2
(45) Date of Patent: Sep. 20, 2016

(54) IDENTIFYING INFLUENCERS FOR TOPICS IN SOCIAL MEDIA

(71) Applicant: International Business Machines Corporation, Armonk, NY (US)

(72) Inventors: Andrey L. Balmin, San Jose, CA (US); Bin Bi, Los Angeles, CA (US); John Sismanis, San Jose, CA (US); Yuanyuan Tian, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 14/149,422

(22) Filed: Jan. 7, 2014

(65) Prior Publication Data

US 2015/0193535 A1 Jul. 9, 2015

(51) Int. Cl.
*G06F 7/00* (2006.01)
*G06F 17/30* (2006.01)

(52) U.S. Cl.
CPC ... *G06F 17/30864* (2013.01); *G06F 17/30696* (2013.01)

(58) Field of Classification Search
CPC .............. G06F 17/30696; G06F 17/30864; G06F 17/30867
USPC ................ 707/692, 706, 723, 741
See application file for complete search history.

(56) References Cited

U.S. PATENT DOCUMENTS

| 9,225,676 | B1* | 12/2015 | Shoham | H04L 51/32 |
| 2008/0082491 | A1* | 4/2008 | Scofield | G06F 17/30648 |
| 2009/0119173 | A1* | 5/2009 | Parsons | G06Q 10/107 705/319 |
| 2011/0072052 | A1 | 3/2011 | Skarin et al. | |
| 2011/0178995 | A1 | 7/2011 | Suchter et al. | |
| 2011/0258229 | A1* | 10/2011 | Ni | G06F 17/277 707/776 |
| 2012/0117059 | A1 | 5/2012 | Bailey et al. | |
| 2013/0132475 | A1* | 5/2013 | Motgi | G06Q 10/10 709/204 |
| 2014/0365404 | A1* | 12/2014 | Bart | G06N 7/005 706/11 |
| 2015/0120782 | A1* | 4/2015 | Kim | G06F 17/3053 707/798 |

OTHER PUBLICATIONS

Authors: Kardara et al., Title: Influence Patterns in Topic Communities of Social Media, Copyright 2012 ACM 978-1-4503-0915, pp. 1-12.*
Bi, B. et al.; "Scalable Topic-Specific Influence Analysis on Microblogs"; WSDM 2014 Accepted Paper, Submitted on Aug. 28, 2013. <http://www.wsdm-conference.org/2014/accepted-papers>.
Blie, D.M.; "Probabilistic Topic Models: Surveying a suite of algorithms that offer a solution to managing large document archives"; Apr. 2012; vol. 55 No. 4; Communications of the ACM; pp. 77-84.

(Continued)

*Primary Examiner* — MD. I Uddin
(74) *Attorney, Agent, or Firm* — John W. Hayes; William H. Hartwell

(57) ABSTRACT

A computer determines social media influencers in a specific topic. The computer receives a dataset of information on a website, the information including a list of users of the website and a list of content that each user posts, wherein each user is associated with one or more other users. The computer identifies a plurality of variables associated with the dataset, wherein the plurality of variables represent the information of the dataset on the website. The computer executes a topic specific search based on the plurality of variables, the topic search providing at least another list of users representing influencers in a specific topic.

15 Claims, 5 Drawing Sheets

(56) References Cited

OTHER PUBLICATIONS

Chen, J. et al.; "An Analysis of Verifications in Microblogging Social Networks—Sina Weibo"; 2012 32nd International Conference on Distributed Computing Systems Workshops; IEEE; pp. 147-154.

Fu, M-H. et al.; "Hidden Community Detection Based on Microblog by Opinion-Consistent Analysis"; 2012 International Conference on Information Society (i-Society); pp. 83-88, IEEE; 2012.

Ghosh, S. et al.; "Cognos: Crowdsourcing Search for Topic Experts in Microblogs"; SIGIR'12, Aug. 12-16, 2012; Portland, Oregon.

Hill, S. et al.; "A Cluster-based Method for Isolating Influence on Twitter"; < https://opimweb.wharton.upenn.edu/index.cfm/research-listing/?whdmsaction=publications.list&pubFilter=otherPublication&pubYearFilter=2011>; University of Pennsylvania; Dec. 2011.

Liu, Y.; "Topic-Link LDA: Joint Models of Topic and Author Community"; Proceedings of the 26th International Conference on Machine Learning; Montreal, Canada, 2009; Copyright 2009.

Song, S. et al.; "Detecting Popular Topics in Micro-blogging Based on a User Interest-Based Model"; WCCI 2012 IEEE World Congress on Computational Intelligence Jun. 10-15, 2012; Brisbane, Australia.

Tian, Y.; "Scalable Topic-Specific Influence Analysis on Microblogs"; UCSB Computer Science; Apr. 23, 2013 submission for May 20, 2013 presentation. <http://www.soe.ucsc.edu/events/event/3217>.

Tian, Y.; "Scalable Topic-Specific Influence Analysis on Microblogs"; Jack Baskin School of Engineering; May 14, 2013 Presentation. <http://www.soe.ucsc.edu/events/event/3217>.

Zhaoyun, D. et al.; "Mining Topical Influencers Based on the Multi-Relational Network in Micro-Blogging Sites"; China Communications; pp. 93-104; Jan. 2013.

\* cited by examiner

IDENTIFYING INFLUENCERS FOR TOPICS IN SOCIAL MEDIA

The following disclosure(s) are submitted under 35 U.S.C. 102(b)(1)(A): DISCLOSURE(S): Scalable Topic-Specific Influence Analysis on Microblogs, UCSB Computer Science, May 20, 2013 Presentation by Yuanyuan Tian, Presentation Filed on Apr. 23, 2013, Pages 1-37.
Scalable Topic-Specific Influence Analysis on Microblogs, Jack Baskin School of Engineering, May 14, 2013 Presentation by Yuanyuan Tian, Pages 1-37.
Scalable Topic-Specific Influence Analysis on Microblogs, wsdm New York City, February 24-28, Bin Bi et al., Paper Filed on Aug. 28, 2013, Ten page document.

BACKGROUND

The present invention relates generally to social media, and more particularly, to identifying influencers in social media. Social influence analysis on social media websites, such as Twitter® and Facebook® have been playing a role in online advertising and brand management. Users often post text on social media websites which can be influenced by or can influence other users. A social media website, such as Twitter®, allows a user to publish (i.e., post) text content in the form of a message. The posted text content can often be seen by the general public or "followers" of the user posting the text content. The flow of information when text content is posted is directed from the user to the "followers." On social media websites, the flow of information is typically constant, with new text content being posted every day from a number of users.

The flow of information among users is typically general with countless topics being discussed and certain users which influence others may not be accurately represented as being influential to a specific topic. For example, on social media website Twitter®, a celebrity can be considered an influencer due to the number of "followers" the celebrity has. The celebrity can have more "followers" than for example, a political analyst. However, if the celebrity posts text content on the topic of politics, one can assume the celebrity may not be as big an influencer as the political analyst, regardless of how many "followers" the celebrity has. Currently, analysis programs separate the examination of text content, on social media websites and social network analysis, such as, which particular user influences a large group of users.

SUMMARY

Embodiments in accordance with the present invention disclose a method, computer program product, and computer system for determining social media influencers in a specific topic. The method includes receiving, by a processor, a dataset of information on a website, the information including a list of users of the website and a list of content that each user posts, wherein each user is associated with one or more other users; identifying, by a processor, a plurality of variables associated with the dataset, wherein the plurality of variables represent the information of the dataset on the website; and executing, by a processor, a topic specific search based on the plurality of variables, the topic search providing at least another list of users representing influencers in a specific topic.

DETAILED DESCRIPTION

Figure 1:
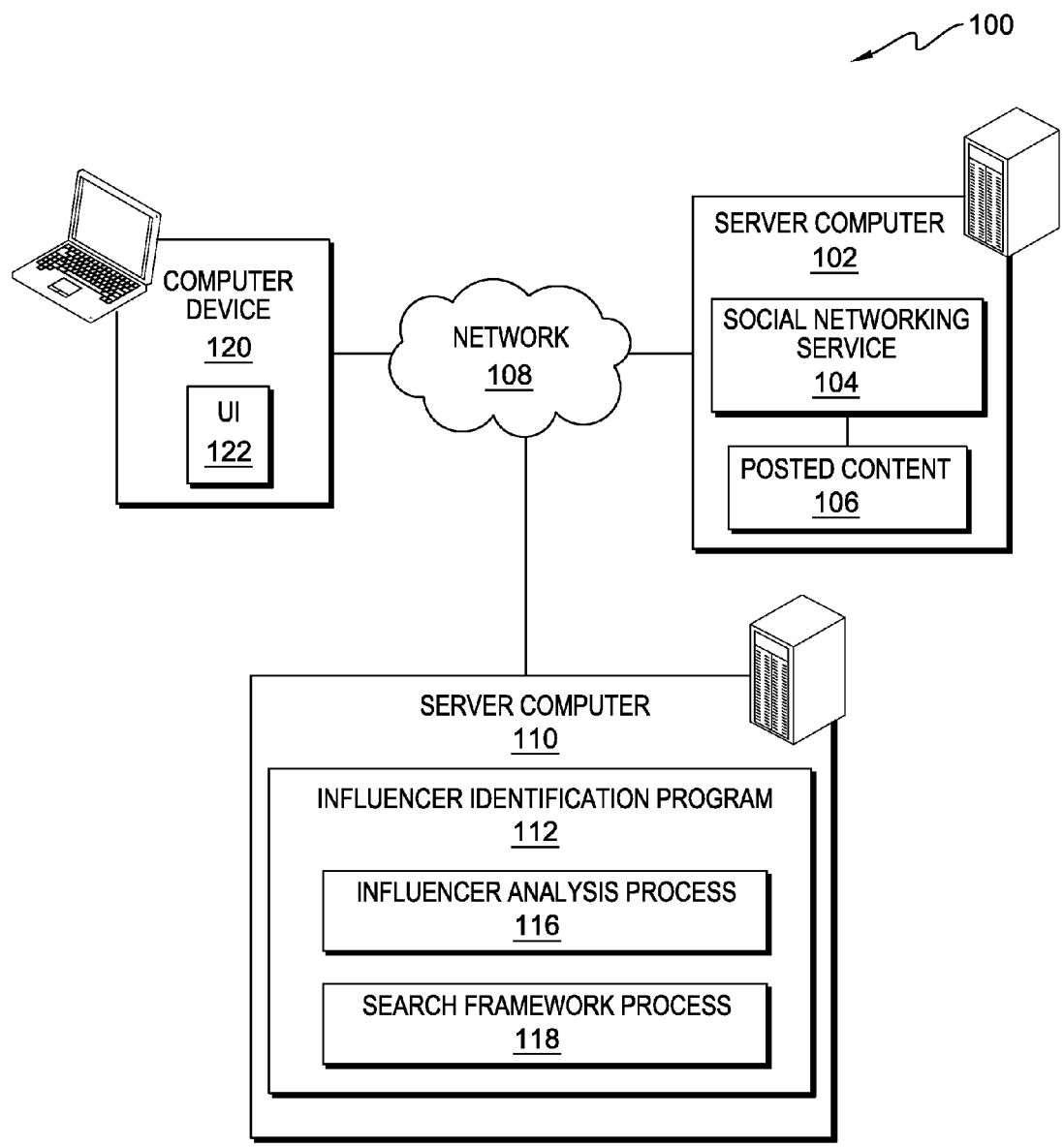
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. Distributed data processing environment 100 includes server computer 102, server computer 110 and computer device 120 interconnected over network 108.

Server computer 102 may be a specialized computer server accessible to multiple client computers via network 108. In certain embodiments, server computer 102 represents a computer system utilizing clustered computers and components that act as a single pool of seamless resources when accessed through network 108, as is common in data centers and with cloud computing applications. In general, server computer 102 is representative of any programmable electronic device or combination of programmable electronic devices capable of executing machine-readable program instructions and communicating with other electronic devices via a network.

Server computer 102 may store, maintain, and provide various services, e.g., social networking service 104, to clients (not shown) of server computer 102. Social networking service 104 facilitates the communication or sharing of information between users of social networking service 104. Social networking service 104 may be, for example, Facebook®, Twitter®, Instagram®, a forum hosting website, a blog hosting website, or any other type of website capable of providing a platform to publicly share information between users. Information shared between users on social networking service 104 is designated herein as posted content 106. Posted content 106 may be a conversation between users, a blog posted by a user, a status update by a user (e.g., tweet), or any other type of text relaying information from one user to the next. For discussion purposes, in this embodiment posted content 106 represents text (i.e., conversation, blog posts, etc.) containing keywords as indicators of influencers for the text.

In general, network 108 can be any combination of connections and protocols that will support communications between server computer 102, server computer 110 and computer device 120. Network 108 can include, for example, a local area network (LAN), a wide area network (WAN), such as the internet, a cellular network, or any combination of the preceding, and can further include wired, wireless, and/or fiber optic connections.

Server computer 110 may be a desktop computer, a laptop computer, a tablet computer, a specialized computer server, a smartphone, or any other computer system known in the art. In certain embodiments, server computer 110 represents a computer system utilizing clustered computers and components that act as a single pool of seamless resources when accessed through network 108, as is common in data centers and with cloud computing applications. In general, server computer 110 is representative of any programmable electronic device or combination of programmable electronic devices capable of executing machine-readable program instructions and communicating with other computer devices via a network. In this embodiment, server computer 110 has the ability to communicate with other computer devices to query the computer devices for information.

Influencer identification program 112 residing in computer server 110 has the ability to examine or receive posted content 106 and identify keywords and possible influencers for the identified keywords. Influencer identification program 112 also has the ability to generate reports and create a search framework based on the identified keywords and possible influencers. Influencer identification program 112 may comprise functions such as influencer analysis process 116 and search framework process 118.

Influencer analysis process 116 can utilize mathematical models to establish a probabilistic procedure based on how content and followees of each user are generated in a social networking website. Influencer analysis process 116 utilizes prior established data sets and examined data sets containing topics and reasons for followship ratios to identify hidden structures that are most likely to generate the observed data.

Search framework process 118 can create and maintain a search engine based on the possible influencers for the identified keywords. The search engine can provide results of said possible influencers when a keyword and/or topic are entered by a user. Search framework process 118 has the ability of keeping the search engine updated based on hidden structures in collected data sets that influencer analysis process 116 identifies.

In one embodiment, influencer identification program 112 may be a web service accessible via network 108 to a user of a separate device, e.g., computer device 120. In another embodiment, influencer identification program 112 may be operated directly by a user of server computer 110.

User interface 122 on computer device 120, displays information that any one of the processes of influencer identification program 112 may display to a user. In various embodiments of the present invention, computer device 120 can be a laptop computer, a tablet computer, a netbook computer, a personal computer (PC), a desktop computer, a personal digital assistant (PDA), a smartphone, or any programmable electronic device capable of performing the required functionality of embodiments of the invention, and communicating with server computer 102 and server computer 110 via network 108. User interface 122 can be, for example, a graphical user interface (GUI) or a web user interface (WUI) and can display text, documents, web browser windows, user options, application interfaces and instructions for operation.

Figure 2:
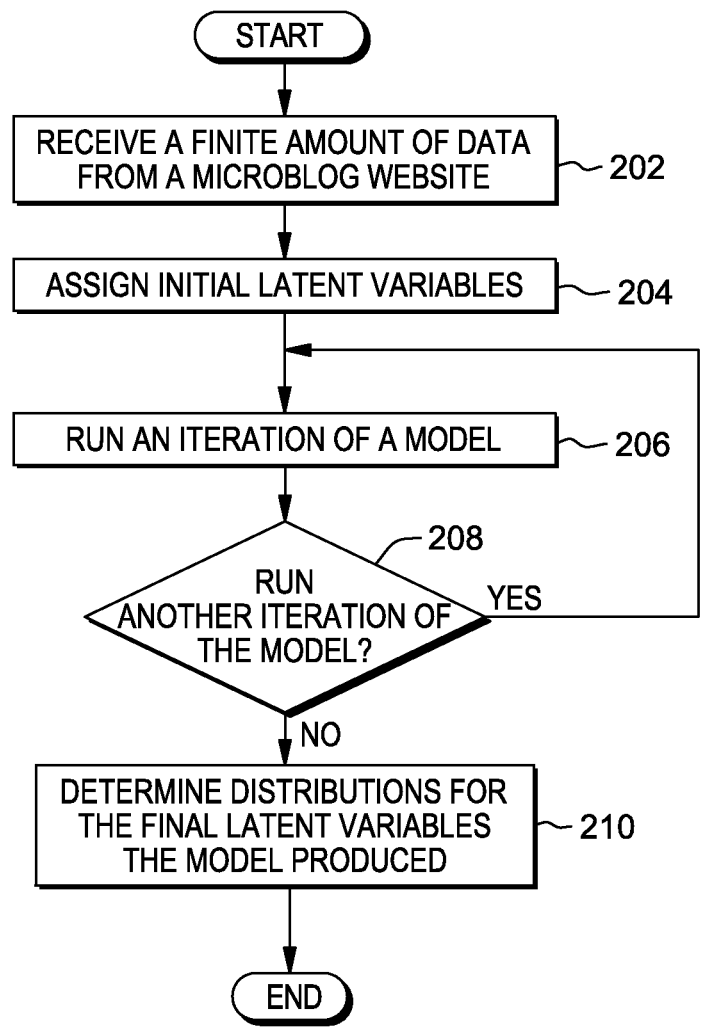
FIG. 2 is a flowchart depicting operational steps of influencer analysis process for topic and social influence analysis, in accordance with an embodiment of the present invention.

FIG. 2 is a flowchart depicting operational steps of influencer analysis process 116 for topic and social influence analysis, in accordance with an embodiment of the present invention.

Figure 4:
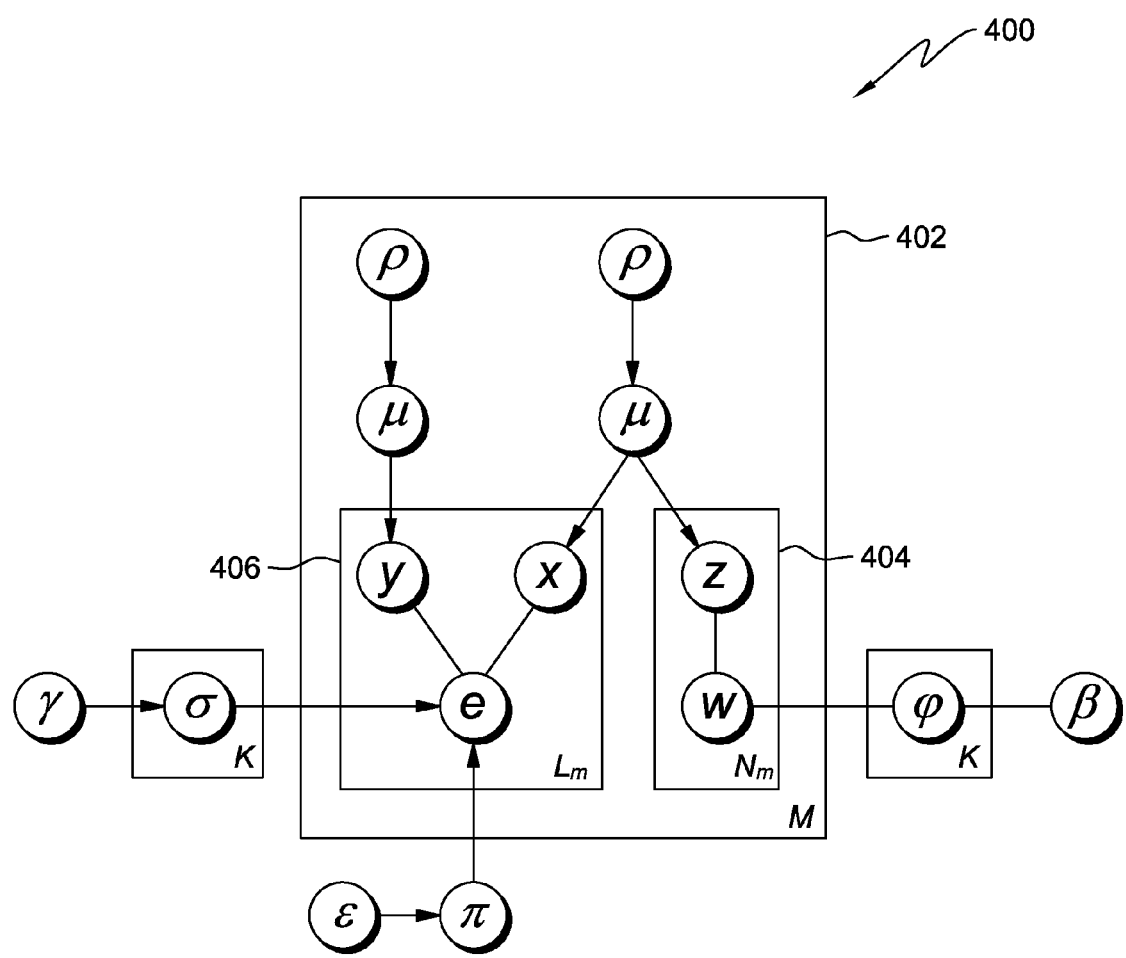
FIG. 4 illustrates a graphical model for Followship Latent Dirichlet Allocation, in accordance with an embodiment of the present invention.

Influencer identification program 112, through influencer analysis process 116, can utilize a Followship Latent Dirichlet Allocation (FLDA) to model the topics and user influence in social networking websites. The graphical model for FLDA is depicted in FIG. 4, with the notations described in Table 1 defining the variables. The general overview of the generative process of a user's posted content and links (i.e., followees) is summarized in Table 2.

TABLE 1

Notations for the FLDA model

| Notation | Description |
| --- | --- |
| θ | Per-user topic distribution |
| φ | Per-topic word distribution |
| σ | Per-topic followee distribution |
| π | Multinominal distribution over followees |
| μ | Per-user Bernoulli distribution over indicators |
| α, β, γ, ε, ρ | Parameters of the Dirichlet (Beta) priors on Multinominal (Bernoulli) distributions |
| w | Word identity |
| e | Followee identity |
| z | Identity of the topic of a word |
| x | Identity of the topic of a followee |
| y | Binary indicator of whether a followship is related to the content of tweets |
| M | Number of unique users |
| V | Number of words in the vocabulary |
| K | Number of unique topics |
| $N_m$ | Number of words in tle tweets of user m |
| $L_m$ | Number of followees for user m |

TABLE 2

Summary of the generative process of a user's posted content and links (i.e., followees)

Choose $\pi \sim \text{Dirichlet}(\epsilon)$
For each topic k = 1, ... , K
    Choose $\phi_k \sim \text{Dirichlet}(\beta)$
    Choose $\sigma_k \sim \text{Dirichlet}(\gamma)$
For each user m = 1, ... , M
    Choose $\theta_m \sim \text{Dirichlet}(\alpha)$
    For the $n^{th}$ word of the $m^{th}$ user, where $n \in \{1, ... , N_m\}$
        Choose a topic $z_{m,n} \sim \text{Multinomial}(\theta_m)$, where $z_{m,n} \in \{1, ... , K\}$
        Choose a word $w_{m,n} \sim \text{Multinomial}(\phi_{z_{m,n}})$,
        where $w_{m,n} \in \{1, ... , V\}$
    Choose $\mu_m \sim \text{Dirichlet}(\rho)$
    For the $l^{th}$ link of the $m^{th}$ user, where $l \in \{1, ... , L_m\}$
        Choose a topic $x_{m,l} \sim \text{Multinomial}(\theta_m)$, where $x_{m,l} \in \{1, ... , K\}$
        Choose an indicator $y_{m,l} \sim \text{Bernoulli}(\mu_m)$, where $y_{m,l} \in \{0,1\}$
        If $y_{m,l} = 0$ then
            Choose a followee $e_{m,l} \sim \text{Multinomial}(\pi)$,
            where $e_{m,l} \in \{1, ... , M\}$
        Else if $y_{m,l} = 1$ then
            Choose a followee $e_{m,l} \sim \text{Multinomial}(\sigma_{x_{m,l}})$,
            where $e_{m,l} \in \{1, ... , M\}$ For generating content, influencer identification program 112 views each user of the social networking website as a mixture of latent topics from which words are drawn, similar to a Latent Dirichlet Allocation (LDA) model. To be more specific, for the $m^{th}$ user, influencer identification program 112 selects a per-user topic distribution $\theta_m$ from a Dirichlet prior variable with a parameter α. Influencer identification program 112 selects a topic $z_{m,n}$ from the topic distribution $\theta_m$ to generate the $n^{th}$ word for the content posted by the user and influencer identification program 112 selects the $n^{th}$ word from the word distribution $\phi_{z_{m,n}}$ for the selected topic.

Influencer identification program 112 generates the followees of the $m^{th}$ user by a three-stage stochastic process where every user has a unique preference of following others based on content or non-content reasons. Influencer identification program 112 utilizes the Bernoulli distribution $\mu_m$ to characterize the per-user preference of every user. As a result, for the $i^{th}$ followee of the $m^{th}$ user, influencer identification program 112 utilizes the Bernoulli distribution to decide the preference of following others based on content or non-content. The variable $y_{m,l}=1$ indicates that the followee is based on the user's content and the variable $y_{m,l}=0$ indicates that content has nothing to do with the link.

If $y_{m,l}=1$ is indicated, the same topic distribution $\theta_m$ is utilized to select a topic $x_{m,n}$ of interest, just as in the content generation part of FLDA. Subsequently, influencer identification program 112 selects a followee $e_{m,l}$ who can address the selected topic from the per-topic followee distribution $\sigma_{xm,l}$. If $y_{m,l}=0$ is indicated, the user is following the followee for non-content reasons. Influencer identification program 112 utilizes $\pi$ to capture this probability distribution. Particularly, Influencer identification program 112 selects a followee $e_{m,l}$ from the multinomial distribution, $\pi$.

The various probability distributions from the FLDA model characterize the different factors that affect the textual and social structures of a social networking website. For a user m, the probability $\theta_{z|m}$ represents the likelihood of m posting content about topic z, and $\mu_{y|m}$ is the probability of the reason indicator y (i.e., content related or non-content related) why the user m follows a followee. For posted content, $\Phi_{w|z}$ gives the probability of word w belonging to topic z. In terms of followees, $\sigma_{e|x}$ captures the likelihood of a user e being followed by someone for a given topic x. This $\pi_e$ value quantifies the influence of user e being followed for any non-content reason. So, $\pi_e$ is measuring the global popularity of user e.

To learn the various distributions in the FLDA model, influencer identification program 112 utilizes collapsed Gibbs Sampling. The posterior distributions for Gibbs Sampling are given by the Equations (1) through (3) in Table 3. To capture the intricate relationship between x and the indicator y in the FLDA model, influencer identification program 112 computes the joint distribution of x and y in the Gibbs Sampling process.

TABLE 3

Posterior Distributions for Gibbs Sampling $$p(z_{m,n}|z_{-(m,n)}, x, \omega, e, y, \alpha, \beta, \gamma, \epsilon, \rho) \quad (1)$$
$$\propto \frac{(c^{-(m,n)}_{z_{m,n},m,*} + d_{z_{m,n},m,*,*} + \alpha_{z_{m,n}})(c^{-(m,n)}_{z_{m,n},*,\omega_{m,n}} + \beta_{\omega_{m,n}})}{c^{-(m,n)}_{z_{m,n},*,*} + \sum_{i=1}^{W} \beta_i}$$

$$p(x_{m,l}, y_{m,l} = 0|y_{-(m,l)}, x_{-(m,l)}, \omega, z, e, \alpha, \beta, \gamma, \epsilon, \rho) \quad (2)$$
$$\propto (c_{x_{m,l},m,*} + d^{-(m,l)}_{x_{m,l},m,*,*} + \alpha_{x_{m,l}})(d^{-(m,l)}_{*,m,*,0} + \rho_0) \times \frac{d^{-(m,l)}_{*,*,e_{m,l},0} + \varepsilon_{e_{m,l}}}{d^{-(m,l)}_{*,*,*,0} + \sum_{i=1}^{M} \varepsilon_i}$$

$$p(x_{m,l}, y_{m,l} = 1|y_{-(m,l)}, x_{-(m,l)}, \omega, z, e, \alpha, \beta, \gamma, \epsilon, \rho) \quad (3)$$
$$\propto (c_{x_{m,l},m,*} + d^{-(m,l)}_{x_{m,l},m,*,*} + \alpha_{x_{m,l}})(d^{-(m,l)}_{*,m,*,1} + \rho_1) \times \frac{d^{-(m,l)}_{x_{m,l},*,e_{m,l},1} + \gamma_{e_{m,l}}}{d^{-(m,l)}_{x_{m,l},*,*,1} + \sum_{i=1}^{M} \gamma_i}$$

In Equations (1) through (3), $z_{m,n}$ denotes the topic of the $n^{th}$ word for the $m^{th}$ user, and $y_{m,l}$ is the reason indicator (content or non-content) of the $l^{th}$ link for the $m^{th}$ user, and $w_{m,n}$, $x_{m,l}$ and $e_{m,l}$ follow similar definitions. Variable, $z_{-(m,n)}$ denotes the topics for all words except $z_{m,n}$, and $y_{-(m,l)}$ and $x_{-(m,l)}$ which follow an analogous definition. Influencer identification program 112 defines $c_{z,m,w}$ as the number of times word w is assigned to topic z for the $m^{th}$ user, and $d_{x,m,e,y}$ as the number of times link e is assigned to topic x for the $m^{th}$ user with indicator y. If any of the dimensions in the notations is not limited to a specific value, influencer identification program 112 utilizes * to denote such occurrences. In this embodiment, * represents an aggregation on the corresponding dimension. For example, $c_{z,*,w}$ is the total number of times word w is assigned to topic z in the entire document collection. Finally, $c_{z,m,w}^{-(m,n)}$ has the same meaning of $c_{z,m,w}$ only with the $n^{th}$ word for the $m^{th}$ user excluded. Similarly, influencer identification program 112 defines $d_{x,m,e,y}^{-(m,l)}$ in the same way as $d_{x,m,e,y}$ but without the count for the $l^{th}$ link for the $m^{th}$ user. After the sampling algorithm has run for an appropriate number of iterations, (until the chain has converged to a stationary distribution) the estimates for the parameters of $\theta$, $\Phi$, $\mu$, $\sigma$, and $\pi$ can be obtained via Equations (4) through (8) as shown in Table 4

TABLE 4

Equations for estimating the parameters $\theta$, $\Phi$, $\mu$, $\sigma$, and $\pi$ $$\theta_{x|m} = \frac{c_{x,m,*} + d_{x,m,*,*} + \alpha_x}{c_{*,m,*} + d_{*,m,*,*} + \sum_{i=1}^{K} \alpha_i} \quad (4)$$

$$\phi_{w|z} = \frac{c_{z,*,\omega} + \beta_\omega}{c_{z,*,*} + \sum_{i=1}^{W} \beta_i} \quad (5)$$

$$\mu_{y|m} = \frac{d_{*,m,*,y} + \rho_y}{d_{*,m,*,*} + \rho_0 + \rho_1} \quad (6)$$

$$\sigma_{e|x} = \frac{d_{x,*,e,1} + \gamma_e}{d_{x,*,*,1} + \sum_{i=1}^{M} \gamma_i} \quad (7)$$

$$\pi_e = \frac{d_{*,*,e,0} + \varepsilon_e}{d_{*,*,*,0} + \sum_{i=1}^{M} \varepsilon_i} \quad (8)$$

Influencer identification program 112 utilizes scalable solutions that can use computation power and memory capacity of multiple computers. However, the Gibbs Sampling updates of FLDA shown in Equations (1) through (3) are sequential but given the amount of words and the number of links in a social networking website dataset, the dependency between different topic assignments or indicator assignments in Equations (1) through (3) is typically weak. As a result, influencer identification program 112 can relax the sequential requirement of the Gibbs Sampling updates and distribute the computation to a number of processes running in parallel. Influencer identification program 112 implements a distributed FLDA Gibbs Sampling algorithm on a distributed cluster computing framework, such as Apache Spark.

One embodiment of a distributed cluster computing framework is Apache Spark. Spark is a large-scale distributed processing framework which targets machine-learning iterative workloads. Spark uses a functional programming paradigm, and applies the functional programming paradigm on large clusters by providing a fault-tolerant implementation of distributed data sets called Resilient Distributed Data (RDD). RDDs can either reside in the aggregate main-memory of the cluster, or in efficiently serialized disk blocks. Especially for iterative processing, the opportunity to store the data in main-memory can significantly speed up processing. Initially an RDD is constructed by reading a file from a distributed filesystem. An RDD contains immutable data; i.e., it cannot be modified, however, a new RDD can be constructed by transforming an existing RDD.

The Spark runtime consists of a single coordinator node, and multiple worker nodes. The coordinator keeps track of how to reconstruct any partition of the RDD whenever any of the workers fails; such failures are common in large-scale clusters (for example, due to network failures/timeouts, power problems, disks running out of space etc.), and long-running jobs are especially affected.

TABLE 5

Listing of exemplary Spark code

```
1    val baseRDD = sc. textFile ("hdfs://master/baseData.log")
2    val lowerRDD = lines.map(String.toLowerCase_)
3    val regexB = sc . broadcast (REGEX)
4    val nMatches = sc . accumulator(0)
5    lowerRDD.foreach(s =>
6        if ( s . matches(regexB.value) )
7            nMatehes += 1
8    )
9    println ( " #Matches is:\%d".format(nMatches.value))
```

Computation in Spark is expressed using functional transformations over RDDs, for example, influencer identification program 112 is to transform each string to lower case with the assumption of a log file. Consider the first two lines of actual Spark code in Table 5: The first line of code defines an RDD of strings, called baseRDD, over a file "baseData.log" stored in a Hadoop Distributed FileSystem; each text line of the log file corresponds to a string of the RDD. The second line of code, uses the map function to transform each string in baseRDD through the function String.toLowerCase. The transformation happens in parallel on all the workers, and defines a new RDD, called lowerRDD that contains the lower-case string of each string in baseRDD.

Spark's programming model provides additionally two useful abstractions: broadcast variables and accumulators. Broadcast variables are initialized at the coordinator node, and made available to all worker nodes, through efficient network broadcast algorithms. Spark chooses a topology-aware network-efficient algorithm to disseminate the data. Line 3 in Table 5 initializes a broadcast variable called regexB to a regular expression (called REGEX). In Line 6, this value is used inside the foreach loop to check if any of the lines in the RDD called lowerRDD matches that regular expression. Note that broadcast variables are immutable, read-only, objects and cannot be modified by the workers.

Similar to a broadcast variable, an accumulator is also a variable that is initialized on the coordinator node, and sent to all the worker nodes. However, unlike a broadcast variable, an accumulator is mutable and can be used to aggregate results of computations at worker nodes. Worker nodes may update the state of the accumulator (usually just by incrementing it, or by using computations such as count and sum). At the end of the RDD transformation, each worker node sends its locally-updated accumulator back to the coordinator node, where all the accumulators are combined (using either a default or user-supplied combine function) into a final result. In this example listing, nMatches is an accumulator that is locally incremented by all workers (line 7) before it is globally aggregated (through an implicit addition over all the partial results in line 9).

As one embodiment of the influencer identification program 112 implemented on Spark, the influencer identification program 112 first defines the notion of a user object. Each user object corresponds to a single user m, and holds information about the content (i.e., the actual words used by user m), and the link structure (i.e., other users that user m is following). For each word w and link e, the user object of influencer identification program 112 holds the last topic assignment, which is the corresponding latent variables z and x. For each link, influencer identification program 112 holds the last binary state (i.e., content related or non-content related), for the y latent variable. Finally, each user object holds the user-local counters $d_{x,m,e,y}$, $c_{x,m,w}$, as well as all aggregates of these (like $d_{*,m,*,*}$), that as shown in Equations (1) through (3) in Table 3. Note that the corresponding local aggregates always have an m index in the subscript. Such aggregates are entirely local to a user and influencer identification program 112 does not share the aggregates.

Note that in addition to the user-local counters and aggregates, Equations (1) through (3) use global aggregates, which are aggregates across all the users (i.e., $d_{x,*,*,t}$). Such global aggregates always have a * instead of m in the corresponding subscript index. The global aggregates need to be shared, though such variables change slowly. The global aggregates are not stored in the user object, but are computed periodically and distributed to all workers through an accumulator.

Second, influencer identification program 112 defines a mapping function, GibbsSampleMap, which takes a user object as an input, runs Gibbs Sampling once and returns a new user object. In particular, this function goes over all the words and links in the object and (a) "undoes" the effects of the last assignment to the latent variables x, y, and z (by properly decreasing the corresponding counts $d_{x,m,e,y}$, $c_{x,m,w}$ and the corresponding local and global aggregates); (b) computes the new probabilities for the latent variables x, y, and z according to the Equations (1) through (3); and finally, (c) assigns new latent variables according to these probabilities, and increases the corresponding counts and all user-local and global aggregates.

Influencer identification program 112 initializes an RDD of user objects by (a) properly parsing and co-grouping the content and the link structure for each user, (b) randomly initializing the latent variable assignments, and (c) computing the corresponding user-local counters and aggregates based on these initial assignments. Influencer identification program 112 runs a number of iterations over the RDD, where each iteration maps all user objects (in parallel) to new user objects using the previously defined GibbsSampleMap function.

Preceding each iteration, influencer identification program 112 accumulates and broadcasts the global aggregates. Each worker has its each own copy of the global aggregates which the mapping function modifies. Thus, although each worker starts with the same global aggregates, as influencer identification program 112 transforms user objects through the mapping functions, the workers' copies of the global aggregates become "out-of-sync", i.e., become progressively dissimilar, until the start of the next iteration when new global aggregates are computed and broadcast. Upon competition of the specified iterations, influencer identification program 112 utilizes Equations (4) through (8) in order to estimate the parameters θ, φ, μ, σ, and π of the FLDA model.

Influencer analysis process 116 utilizes a collected data set to identify hidden structures in the collected data set. The data sets contain words posted by each user along with followees, which each user follows on a social networking website (i.e., microblog website). The hidden structures (i.e., latent variables) can reveal how certain users influence other users in certain topic areas. Influencer analysis process 116 can scale such a process by utilizing multiple computer devices where each computer device is assigned a certain amount of users to analyze. Influencer analysis process 116 sends the information to a master computing device which compiles the analyzed information and sends the total information back to the multiple computing devices to perform another iteration of analysis on the certain amount of users. Influencer analysis process 116 can have a specified amount of iterations which are performed. In addition, influencer analysis process 116 can have check pointing for fault tolerances. For example, the check point can occur every 10 iterations that influencer analysis process 116 performs, to ensure the analysis is not compromised.

In FIG. 2, Influencer analysis process 116 receives a finite amount of data from a microblog website (step 202). In one embodiment, influencer analysis process 116 can receive the finite amount of data through a separate web crawler program. In another embodiment, a user may input the finite amount of data via a file upload into influencer analysis process 116 through user interface 122. The finite data is used by influencer analysis process 116 to infer information such as a user topic distribution for each user, a followship ratio, a user topic distribution and word distribution for each word posted on the social networking website by the user, and an evaluation of the followees of the user.

Influencer analysis process 116 assigns initial latent variables (step 204). In one embodiment, influencer analysis process 116 utilizes a Followship Latent Dirichlet Allocation (FLDA) model for a generative process. For the collection of users, the generative process of FLDA selects an $m^{th}$ user of a social media website and selects a user topic distribution from a Dirichlet prior value. The user topic distribution is a division of the topics to which a user is assigned to. For example, a user topic distribution can be 80% relating to politics, 15% relating to sports, and 5% relating to cooking. Influencer analysis process 116 can select one topic distribution for a first user and another topic distribution for a second user, where there is no correlation between the two user topic distributions.

For the same user for which the generative process of FLDA selects a user topic distribution, the generative process of FLDA also selects a followship ratio for the user. The followship ratio is the likelihood the user follows another user based on a topic from the selected user topic distribution. For example, if a ratio of 4:1 is assigned to a user, the user follows another user for a topic 75% of the time, and for 25% of the time, the user follows another user for non-content related reasons.

Based on the user topic distribution and the followship ratio, the generative process of FLDA generates the content for the user. To generate each word for the user, the generative process of FLDA selects one topic from the user topic distribution and then selects one word to represent this topic. The generative process of FLDA selects one word from a word distribution for the one selected topic. The generative process of FLDA continues the selection of the words for the remaining words in the word distributions for the particular topic.

Subsequent to the generative process of FLDA generating content with the topic selected words, the generative process of FLDA proceeds by generating users that the particular user follows (i.e., followees). For each followee the generative process of FLDA generates, influencer analysis process assigns a followship reference to each followee. The followship preference designates whether or not the followee is being followed for content reasons or non-content reason. If the followee is being followed for content reasons, the generative process of FLDA selects a topic from the user topic distributions to which the followee is assigned. If the followee is being followed for non-content reasons, influencer analysis process 116 designates the followee as a "global followee", whose popularity is based on a global distribution. The global distribution measures the probability of a user being followed for any non-content reason.

The generative process of FLDA repeats this process for each user to generate the prior content. Each user has a user topic distribution, a followship ratio, a user topic distribution and word distribution for each word posted on the social networking website by the user, and an evaluation of the followees of the user.

Influencer analysis process 116 runs an iteration of a model (step 206). In this embodiment, the model is based on a Gibbs Sampling method where the model runs through a number of iterations reassigning values for the latent variables based on the current values of the latent variables as well as the received finite data. For example, in the first iteration of the model, the Gibbs Sampling method utilizes the initial latent variables that influencer analysis process 116 assigns in step 204, and the finite data influencer analysis process received in step 202. Influencer analysis process 116 initializes the latent variable and runs an iteration of the model. For each iteration, the algorithm behind the models makes one pass on the data. During each pass of the data, for each $m^{th}$ user, influencer analysis program 118 assigns new values to the latent variables based on the current values of the latent variables and the received finite data.

For the $n^{th}$ word of the $m^{th}$ user, influencer analysis process 116 identifies an observed value for the word. Influencer analysis process 116 examines a new topic for each $n^{th}$ word posted by the $m^{th}$ user. Upon completion of the examination of the word posted by the $m^{th}$ user, influencer analysis process 116 examines the followees of the $m^{th}$ user. For each $i^{th}$ followee, influencer analysis process 116 examines a followship ratio. The followship ratio indicates the probability of a user following other users based on content-related reasons or content-independent reasons. If the $i^{th}$ followee is based on content-related reasons, influencer analysis process 116 examines a topic from the user topic distribution of the $m^{th}$ user for $i^{th}$ followee.

Influencer analysis process 116 while examining, keeps count of the number of times a particular topic from the user topic distribution is assigned to an $n^{th}$ word of the $m^{th}$ user. Influencer analysis process 116 also keeps count of the number of times a followship ratio is assigned to the $i^{th}$ followee of the $m^{th}$ user. Influencer analysis process 116 continues the examination for each $m^{th}$ user of the social networking website.

Influencer analysis process 116 determines if another iteration of the model is to run (decision step 208). If influencer analysis process 116 determines to run the other iteration ("yes" branch, step 208), influencer analysis process 116 reverts back to step 206 and runs the other iteration with the newly assigned data. If influencer analysis process 116 determines not to run the other iterations ("no" branch, step 208), influencer analysis process 116 consolidates the data from the model.

Influencer analysis process 116 determines distributions for the final latent variables the model produced (step 210). Influencer analysis process 116 utilizes the final latent variables the model (i.e., Gibbs Sampling method) produced to estimate the posterior distribution for the final latent variables. An example of a posterior distribution is the probability an $m^{th}$ user is being followed for a give topic (i.e., topic-specific influence score). In one embodiment, the hidden structures are probability based portion values of the final latent variables.

Influencer analysis process 116 assigns each $m^{th}$ user a final user topic distribution which correlates to the collected data. For example, influencer analysis process 116 identifies that a select $m^{th}$ user posted content relating to "technology" 80% of the time, "food" 19% of the time, and "politics" 1% of the time. Influencer analysis process 116 determines such a final user topic distribution for each $m^{th}$ user.

For each final user topic distribution, influencer analysis process 116 identifies a final word distribution for each of the topics in each of the final user topic distributions. For example, influencer analysis process 116 identifies that the topic "technology" from the final user topic distribution has a final word distribution which was observed to be "web" 30% of the time, "cookie" 10% of the time, "veggie" 1% of the time, and so on. Influencer analysis process 116 determines such a final word distribution for each topic in the final user topic distribution for each $m^{th}$ user.

For each $m^{th}$ user, influencer analysis process 116 identifies an overall followship ratio. For example, a particular $m^{th}$ user follows a followee based on content 75% of the time, and follows a followee based on non-content related reason 25% of the time. For non-content related reasons, the particular $m^{th}$ user can follow a followee based on global popularity. A global popularity value measures the probability of a user being followed for any content-independent reason.

Influencer analysis process 116 identifies topic specific values for each $m^{th}$ user based on the total list of topics previously identified. For each topic, influencer analysis process 116 identifies the topic specific values for each $m^{th}$ user regardless of whether or not a particular $m^{th}$ user even discussed the topic. Influencer analysis process 116 performs this process for each topic identified in the collected data set.

Figure 3:
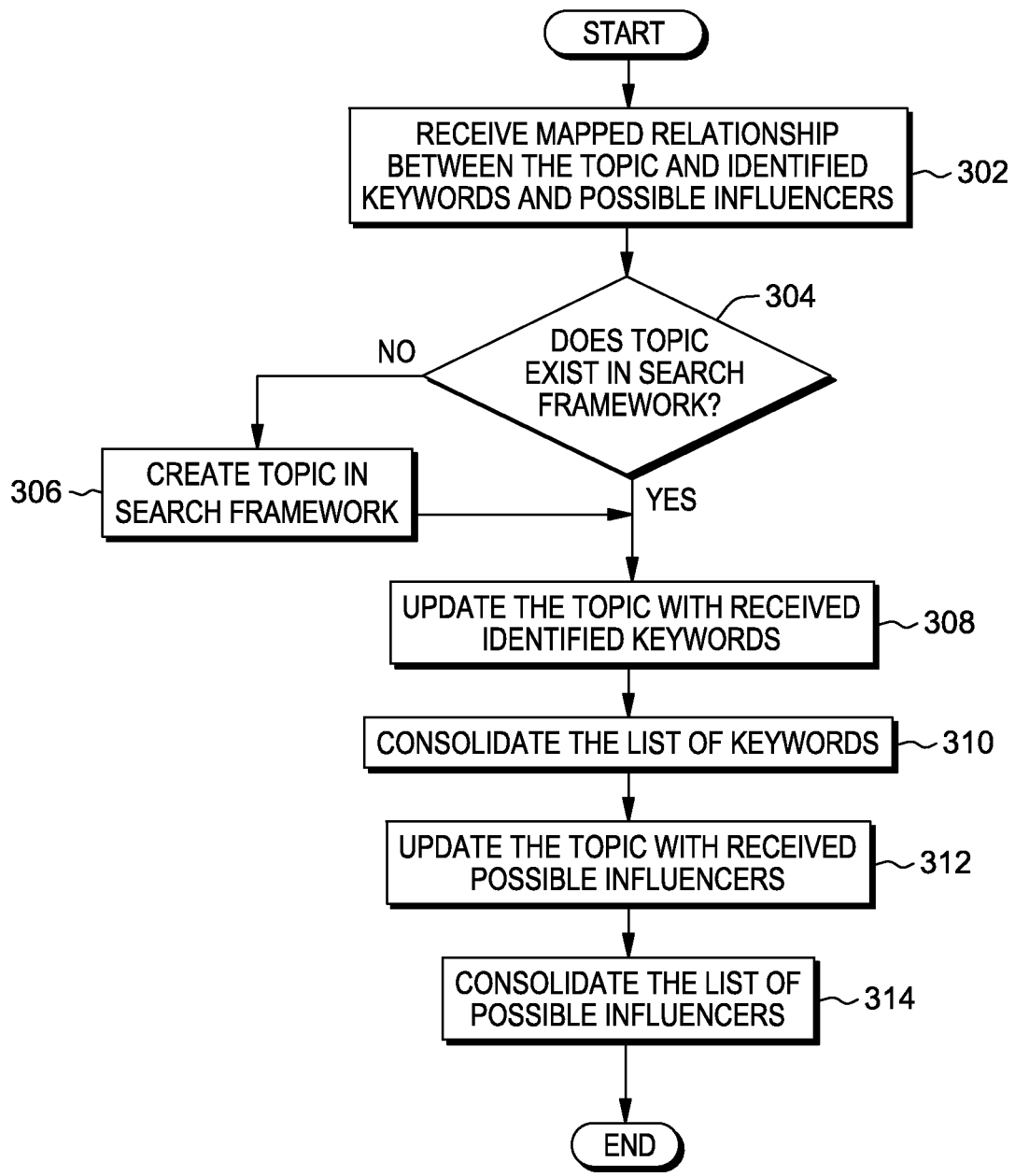
FIG. 3 is a flowchart depicting operational steps of a search framework process for creating and maintaining a topic influencer search engine, in accordance with an embodiment of the present invention.

FIG. 3 is a flowchart depicting operational steps of a search framework process for creating and maintaining a topic influencer search engine, in accordance with an embodiment of the present invention.

In one embodiment, a search engine framework allows an end user to freely express interests by typing a set of keywords. The search engine can return an ordered list of key influencers, by influence scores that satisfy the user's set of keywords, and the search engine can plug in different topical influence methods. The search engine utilizes the underlying influence analysis such as, the derivation of interested topics from the query keywords, and the per-topic influence scores for every user in a microblog dataset. To be more specific, given a set of key words as a query q, the search engine first derives a weight W(t,q) for each topic t in the set of all topics T, indicating the likelihood of topic t being represented by query q. Then, utilizing the per-topic influence score for each user INFL(t,u) learned from the underlying influence analysis, the influence score INFL(q,u) for a user u, given a query q, is computed as shown in Equation (9) shown in Table 6.

TABLE 6

Equation for computing influence score $$\text{INFL}(q, u) = \sum_{t \in T} W(t, q) \cdot \text{INFL}(t, u). \qquad (9)$$

The users are returned in decreasing order according to the influence scores, INFL(q,u). Utilizing the FLDA model as the underlying topic-specific influence analysis method produces the probability distributions $\theta_{z|m}$ and $\sigma_{e|x}$ as part of the results. $\theta_{z|m}$ represents the probability of topic z given user m, and $\sigma_{e|x}$ is the probability of user e being followed by someone given topic x. If query q is treated as a new user, search framework process 118 can use the folding-in or the variation inference technique on FLDA to identify $\theta_{z=t|m=q}$, the probability of topic t given the query q, and use the value as W(t,q) in Equation (9). The per-topic influence score INFL(t,u) for each user can be quantified by $\sigma_{e=u|x=t}$. Besides FLDA, the search framework can also plug-in Link-LDA, Topic-sensitive PageRank and TwitterRank. The folding-in and the variation inference techniques equally apply to Link-LDA and LDA, if LDA is used in the topic modeling preprocess for Topic-sensitive PageRank and TwitterRank, to compute W(t,q). The definition of INFL(t,u) for Link-LDA is the same as in FLDA. For both Topic-sensitive PageRank and TwitterRank, INFL(t,u) is simply the PageRank score for user u and topic t.

Search framework process 118 provides a way of creating and maintaining a search engine based on the hidden structures that influencer analysis process 116 identifies. Search framework process 118 can provide a search engine, where the search engine can receive a user input in the form of text specifying a topic, a keyword, or a combination of keywords. The search engine can produce possible influencers to the user according to previously mentioned methods in the discussion of influencer analysis process 116. As previously discussed, each topic has a word distribution and search framework process 118 designates the words in each word distribution as the keywords for that topic.

Search framework process 118 receives a mapped relationship between each topic and identified keywords and possible influencers (step 302). In one embodiment, search framework process 118 can periodically receive one or more mapped relationships between each topic and identified keywords and possible influencers. Search framework process 118 can be user programmed to receive mapped relationships periodically, where the period can be minute, hour, day, monthly, or yearly based. Search framework process 118 is also capable of receiving multiple mapped relationships between each topic and identified keywords and possible influencers. Search framework process 118 can proceed to update the search engine framework with the oldest relationship mapped by influencer analysis process 116.

Search framework process 118 determines if the topic exists in the search framework (decision 304). If search framework process 118 determines the topic does not exist in the search framework ("no" branch, decision 304), search framework process 118 creates the topic in the search framework (step 306). If search framework process 118 determines the topic does exist in the search framework ("yes" branch, decision 304), search framework process 118 updates the topic with the received identified keywords.

Search framework process 118 can create the topic in the search framework along with any identified variation of the wording of the topic. For example, if the topic is "politics" other possible variations can include "politic", "politician", and "politicians." Since the variations of the word contains the stem "politic", search framework process 118 recognizes all variations of the topic derived from the stem of the word. In one embodiment, search framework process 118 can have access to an online dictionary or a local dictionary tool on the server computer on which search framework process 118 is stored. Search framework process 118 is capable of querying the online dictionary or the locally stored dictionary tool to identify the stem of a word and all possible variations of the word.

Search framework process 118 updates the topic with the received identified keywords (step 308). Search framework process 118 is capable of comparing the received identified keywords with the keyword list which already exist in the search engine framework for the specific topic. If search framework process 118 determines there is one or more received identified keywords which do not exist on the keyword list, search framework process 118 can add the one or more received identified keywords. If search framework process 118 determines the received identified keywords do exist on the keyword list, search framework process 118 can integrate the rank of the identified received keywords to the rank of the corresponding keywords on the keyword list. For example, a received identified keyword ranks first in the latest rankings by influencer analysis process 116 but the same identified keyword ranks seventh in the rankings of the search engine framework.

In one embodiment, search framework process 118 can average both rankings (i.e., search engine framework rank and latest received rank), to establish an update for the ranking of the received identified keyword. The updated ranking integrates past popularity of the keyword and recent popularity of the keyword for the given topic.

Search framework process 118 consolidates the list of keywords for each topic (step 310). Search framework process 118 has the ability to consolidate the list of keywords to ensure the search engine when queried by a user does not produce insufficient results. In situations where a user inputs a keyword rather than a topic into a search engine, the search engine can have the ability to identify the topic with which the inputted keyword is associated. Using the identified topic, the list of possible influencers of the highest ranked keywords for the topic can be displayed for the user along with the list of possible influencers for the originally inputted keyword. In one embodiment, search framework process 118 consolidates the list of keywords that rank below a certain value. Typically, lower ranked keywords have a smaller chance of yielding desirable results from the search engine, hence search framework engine 118 can remove the keywords from the list along with the associated possible influencers for each of the keywords.

Search framework process 118 updates the topic with the received possible influencers (step 312). Similarly to how search framework process 118 updates the topic with the received keywords, search framework process 118 can update the topic with the received possible influencers in the same manner. Since possible influencers can be associated with multiple topics, the topics a possible influencer is associated with are locally stored in the form of metadata. Search framework process 118 is capable of comparing the received possible influencers with the possible influencers list which already exist in the search engine framework for the specific topic. If search framework process 118 determines there is one or more received possible influencers which do not exist on the possible influencers list, search framework process 118 can update the possible influencers list with the one or more received possible influencers. If search framework process 118 determines the received possible influencers do exist on the possible influencers list, search framework process 118 can integrate the rank of the identified possible influencers to the rank of the corresponding possible influencers on the possible influencers list. For example, a received possible influencers ranks first in the latest rankings by influencer analysis process 116 but the same possible influencers ranks seventh in the rankings of the search engine framework.

In one embodiment, search framework engine 118 can average both rankings (i.e., search engine framework rank and latest received rank), to establish an update for the ranking of the received possible influencers. The updated ranking integrates past popularity of the possible influencers and recent popularity of the possible influencers for the given topic. Continuing from the previous example where the received possible influencer ranks first and the stored possible influencer ranks seventh in the search engine framework, search framework process 118 averages the two ranks to be three and a half. Furthermore, search framework process 118 can round the average rank towards the received possible influencers rank since it is an updated representation of where the possible influencers ranks.

Search framework process 118 consolidates the list of possible influencers for each topic (step 314). Search framework process 118 has the ability to consolidate the list of possible influencers to ensure that the search engine, when queried by a user, does not produce insufficient results. Search framework process 118 can consolidate the list based on various criteria. In one embodiment, search framework process 118 consolidates the list of possible influencers according to rank criteria.

FIG. 4 illustrates a graphical model for Followship Latent Dirichlet Allocation, in accordance with an embodiment of the present invention.

Plate notation 400 represents the generative process of Followship Latent Dirichlet Allocation (FLDA). Outer box 402 represents the repetition for the users, right inner box 404 represents repeated generations of words, and left inner box 406 represents repeated generation of links. Utilizing the defined variables in Table 1 and the discussion of the operational steps in FIG. 2, influencer analysis process 116 can generate content and links following the plate notation 400 for the FLDA model.

Figure 5:
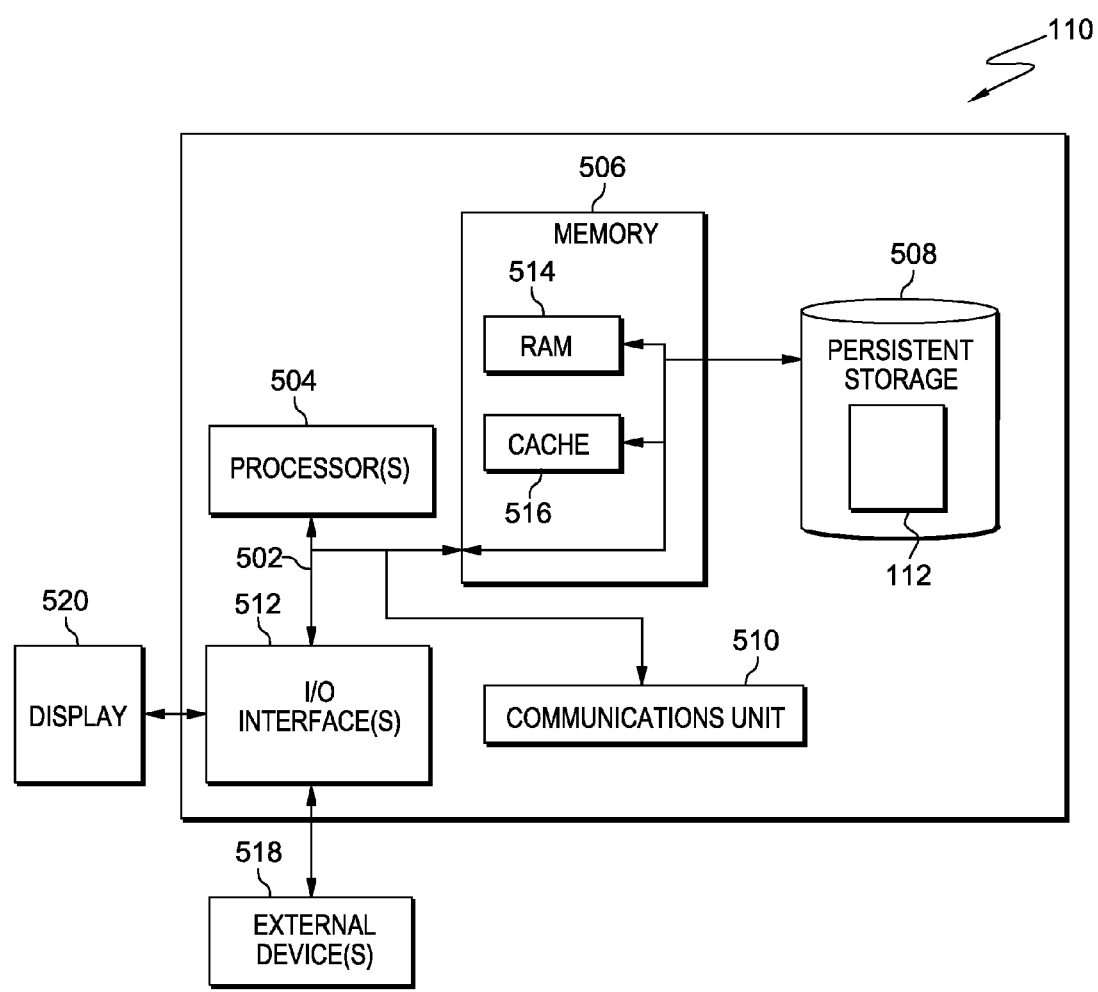
FIG. 5 is a block diagram of components of a computer system, such as the computer server of FIG. 1, in accordance with an embodiment of the present invention.

FIG. 5 depicts a block diagram of components of a computer 500 operating influencer identification program 112 within server computer system 110, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server computer 110 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are examples of computer-readable tangible storage devices. A storage device is any piece of hardware that is capable of storing information, such as, data, program code in functional form, and/or other suitable information on a temporary basis and/or permanent basis. In this embodiment, memory 506 may be, for example, one or more random access memories (RAM) 514, cache memory 516, or any other suitable volatile or non-volatile storage device.

Influencer identification program 112 is stored in persistent storage 508 for execution by one or more of computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage medium that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including systems and devices within or controlled by server computer 110. In these examples, communications unit 510 includes one or more wireless network interface cards. Communications unit 510 may provide communications through the use of either or both physical and wireless communications links. Computer programs and processes, such as influencer identification program 112, may be downloaded to persistent storage 508 through communications unit 510, or uploaded to another system through communications unit 510.

I/O interface(s) 512 allows for input and output of data with other devices that may be connected to server computer 110. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 508 via I/O interface(s) 512. I/O interface(s) 512 may also connect to a display 520.

Display 520 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present invention may take the form of a computer program product embodied in one or more computer-readable media having computer readable program code/instructions embodied thereon.

Any combination of computer-readable media may be utilized. Computer-readable media may be a computer-readable signal medium or a computer-readable storage medium. A computer-readable storage medium may be, for example, but is not limited to, an electronic, magnetic, optical, electromagnetic, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like, and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention were described with reference to flowchart illustrations and/or block diagrams of methods, apparatus (systems) and computer program products according to embodiments of the invention. It is understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

What is claimed is:

1. A method for determining social media influencers in a specific topic, the method comprising:
   receiving, by a processor, a dataset of information associated with a website, the information including a first list of users of the website and a list of content that each user posts on the website, wherein each user is associated with one or more other users from the first list of users;
   determining, by a processor, initial values representing variables of the dataset of information on the website, wherein the variables include one or more topics for the list of content that each user from the first list of users posts on the website;
   performing, by a processor, one or more iterations of Gibbs Sampling utilizing the initial values, wherein performing each of the one or more iterations assigns new values representing variables of the dataset;
   determining, by a processor, that the one or more new values representing variables of the dataset represent a distribution of the one or more topics for the list of content that each user from the first list of users posts;
   executing, by a processor, a topic specific search in a topic search engine based on the distribution of the one or more topics for the list of content that each user from the first list of users posts, the topic search providing a subset list of the first list of users representing influencers in a specific topic;
   identifying, by a processor, one or more topics in the list of content that each user of the first list of users posts on the website;
   determining, by a processor, the one or more topics do not exist in the topic search engine;
   creating, by a processor, the one or more topics in the topic search engine;
   identifying, by a processors, a list of keywords in the list of content that each user from the first list of users posts on the website; and
   consolidating, by a processor, the list of keywords.

2. The method of claim 1, wherein the one or more new values statistically represent one or more topics for which each user associates with the one or more other users.

3. The method of claim 2, further comprising:
   determining, by a processor, for each user, percentage values for the one or more variables, wherein the percentage values represent an occurrence for which of the one or more topics each user associates with the one or more other users.

4. The method of claim 1, wherein performing one or more iterations of Gibbs Sampling utilizing the initial values, further comprises:
   performing, by a processor, a first iteration of Gibbs Sampling, wherein performing the first iteration assigns a first set of values as new values representing variables of the dataset; and
   performing, by a processor, a second iteration of Gibbs Sampling, wherein performing the second iteration assigns a second set of values as part of the new values representing variables of the dataset.

5. The method of claim 4, wherein the second set of values replaces a part of the first set of values.

6. A computer program product comprising:
   one or more computer readable storage-media and program instructions stored on at least one of the one or more computer readable storage media, the program instructions comprising:
   program instructions to receive a dataset of information associated with a website, the information including a first list of users of the website and a list of content that each user posts, wherein each user is associated with one or more other users from the first list of users;
   program instructions to determine initial values representing variables of the dataset of information on the website, wherein the variables includes one or more topics for the list of content that each user from the first list of users posts on the website;
   program instructions to perform one or more iterations of Gibbs Sampling utilizing the initial values, wherein performing each of the one or more iterations assigns new values representing variables of the dataset;
   program instructions to determine that the one or more new values representing variables of the dataset represent a distribution of the one or more topics for the list of content that each user from the first list of users posts;
   program instructions to execute a topic specific search in a topic search engine based on the distribution of the one or more topics for the list of content that each user from the first list of users posts, the topic search providing a subset list of the first list of users representing influencers in a specific topic;
   program instructions to identify one or more topics in the list of content that each user of the first list of users posts on the website;
   program instructions to determine the one or more topics do not exist in the topic search engine;
   program instructions to create the one or more topics in the topic search engine;
   program instructions to identify a list of keywords in the list of content that each user from the first list of users posts on the website; and
   program instructions to consolidate the list of keywords.

7. The computer program product of claim 6, wherein the one or more new values statistically represent one or more topics for which each user associates with the one or more other users.

8. The computer program product of claim 7, further comprising program instructions, stored on the one or more computer readable storage media, which when executed by a processor, cause the processor to:
determine for each user, percentage values for the one or more variables, wherein the percentage values represent an occurrence for which of the one or more topics each user associates with the one or more other users.

9. The computer program product of claim 6, wherein performing one or more iterations of Gibbs Sampling utilizing the initial values, further comprises program instructions, stored on the one or more computer readable storage media, which when executed by a processor, cause the processor to:
perform a first iteration of Gibbs Sampling, wherein performing the first iteration assigns a first set of values as new values representing possible variables; and
perform a second iteration of Gibbs Sampling, wherein performing the second iteration assigns a second set of values as part of the new values representing possible variables.

10. A computer system comprising:
one or more computer processors;
one or more computer readable storage media; and
program instructions stored on the one or more computer readable storage medium for execution by at least one of the one or more computer processors, the program instructions comprising:
program instructions to receive a dataset of information associated with a website, the information including a first list of users of the website and a list of content that each user posts, wherein each user is associated with one or more other users from the first list of users;
program instructions to determine random values representing variables of the dataset of information on the website, wherein the variables includes one or more topics for the list of content that each user from the first list of users posts on the website;
program instructions to perform one or more iterations of Gibbs Sampling utilizing the initial values, wherein performing each of the one or more iterations assigns new values representing variables of the dataset;
program instructions to determine that the one or more new values representing variables of the dataset represent a distribution of the one or more topics for the list of content that each user from the first list of users posts;
program instructions to execute a topic specific search in a topic search engine based on the distribution of the one or more topics for the list of content that each user from the first list of users posts, the topic search providing a subset list of the first list of users representing influencers in a specific topic;
program instructions to identify one or more topics in the list of content that each user of the first list of users posts on the website;
program instructions to determine the one or more topics do not exist in the topic search engine;
program instructions to create the one or more topics in the topic search engine;
program instructions to identify a list of keywords in the list of content that each user from the first list of users posts on the website; and
program instructions to consolidate the list of keywords.

11. The computer program product of claim 9, wherein the second set of values replaces a part of the first set of values.

12. The computer system of claim 10, wherein the one or more new values statistically represent one or more topics for which each user associates with the one or more other users.

13. The computer system of claim 12, further comprising program instructions, stored on the one or more computer readable storage media, which when executed by a processor, cause the processor to:
determine for each user, percentage values for the one or more variables, wherein the percentage values represent an occurrence for which of the one or more topics each user associates with the one or more other users.

14. The computer system of claim 10, wherein performing one or more iterations of Gibbs Sampling utilizing the initial values, further comprising program instructions, stored on the one or more computer readable storage media, which when executed by a processor, cause the processor to:
perform a first iteration of Gibbs Sampling, wherein performing the first iteration assigns a first set of values as new values representing variables of the dataset; and
perform a second iteration of Gibbs Sampling, wherein performing the second iteration assigns a second set of values as part of the new values representing variables of the dataset.

15. The computer system of claim 14, wherein the second set of values replaces a part of the first set of values.

* * * * *